United States Patent [19]

Comeaux

[11] Patent Number: 5,291,912
[45] Date of Patent: Mar. 8, 1994

[54] RUPTURE DISK FOR FIRE SAFE VALVES

[75] Inventor: David D. Comeaux, Sugar Land, Tex.

[73] Assignee: ABB Vetco Gray Inc., Houston, Tex.

[21] Appl. No.: 75,065

[22] Filed: Jun. 10, 1993

[51] Int. Cl.⁵ .................... F16K 17/14; F16K 17/38
[52] U.S. Cl. ...................... 137/14; 137/68.1; 251/327
[58] Field of Search ............ 137/14, 68.1, 72, 74; 251/326, 327, 266

[56] References Cited

U.S. PATENT DOCUMENTS

| | | | |
|---|---|---|---|
| 3,060,964 | 10/1962 | Bagwell | 137/599 |
| 3,307,574 | 3/1967 | Anderson | 137/312 |
| 3,765,440 | 10/1973 | Grove et al. | 137/246.22 |
| 4,314,579 | 2/1982 | Wheatley et al. | 137/312 |
| 4,393,889 | 7/1983 | Binegar et al. | 137/72 |
| 4,515,174 | 5/1985 | Hollister et al. | 137/72 |

Primary Examiner—John Rivell
Attorney, Agent, or Firm—James E. Bradley

[57] ABSTRACT

A gate valve has a relief passage to prevent excessive pressure buildup in the cavity of the body in the event of a fire. The gate valve has an upstream passage side and a downstream passage side that intersect the cavity. Seat rings are located at the intersection of the upstream and downstream passage sides with the cavity. A split gate moves between open and closed positions with the seat rings. A relief passage extends from the cavity to the upstream passage side. A frangible device locates in the relief passage to block flow during normal operation. If the pressure differential between the cavity and the upstream side exceeds a selected minimum, the frangible member breaks, allowing flow through the relief passage. This relieves pressure in the cavity.

13 Claims, 2 Drawing Sheets

RUPTURE DISK FOR FIRE SAFE VALVES

BACKGROUND OF THE INVENTION

1. Field of the Invention

This invention relates in general to gate valves, and in particular to a rupture disk for preventing excessive pressure buildup in the cavity of a double block gate valve in the event of a fire.

2. Description of the Prior Art

Gate valves of the type concerned herein have a body with a cavity and are used in oil and gas well production. A flow passage extends transversely through the cavity. This results in an upstream passage side on one side of the cavity and a downstream passage side on the other side of the cavity. Seat rings are located at the intersection of the flow passage with the cavity. The gate valve has a gate, which will be moved by an actuator between the seat rings. The gate can be moved between a closed position, blocking flow through the flow passage, and an open position, allowing flow through the flow passage.

In one type of gate valve, the gate is split into two blocks, one of which engages the downstream seat ring and the other which can engage the upstream seat ring.

During normal operation, only the downstream gate block seats as it will be forced by upstream pressure against the downstream seat. Leakage from the upstream passage passes between the upstream seat ring and upstream gate block into the cavity of the housing. The upstream gate block seats against the upstream gate normally only in the event the valve is tested by applying downstream pressure to the valve when it is closed. In the test, higher pressure from the downstream passage presses the upstream gate block into sealing engagement with the upstream seat ring.

In the event of a fire, the valve will be closed either manually or automatically. The downstream gate block will seat against the downstream seat ring, blocking flow from the well. Fluid from the well at the upstream side will fill the cavity. As the heat of the fire heats the body of the valve, the pressure of the fluid in the cavity will increase. The upstream gate block will thus seal against the upstream seat ring. The pressure in the cavity could reach a level that is beyond the capability of the valve. This could result in rupturing of the valve body.

SUMMARY OF THE INVENTION

In this invention, a relief passage is provided in the valve body, extending from the cavity of the body to the upstream passage side. A frangible means locates in the relief passage for blocking flow through the relief passage during normal operation. If pressure in the cavity exceeds that of the upstream passage side by a selected amount, the frangible means will break, allowing flow through the relief passage. This allows pressure in the cavity to relieve to the upstream passage side in the event of fire. The downstream gate block remains seated.

In the preferred embodiment, the frangible means comprises a rupture disk that is held in a counterbore section in the relief passage by a retainer. The rupture disk has a bulge which protrudes toward the upstream passage. The bulge results in less pressure differential being required to rupture the disk if the higher pressure is on the cavity side than if the higher pressure were on the upstream side.

DETAILED DESCRIPTION OF THE INVENTION

Figure 1:
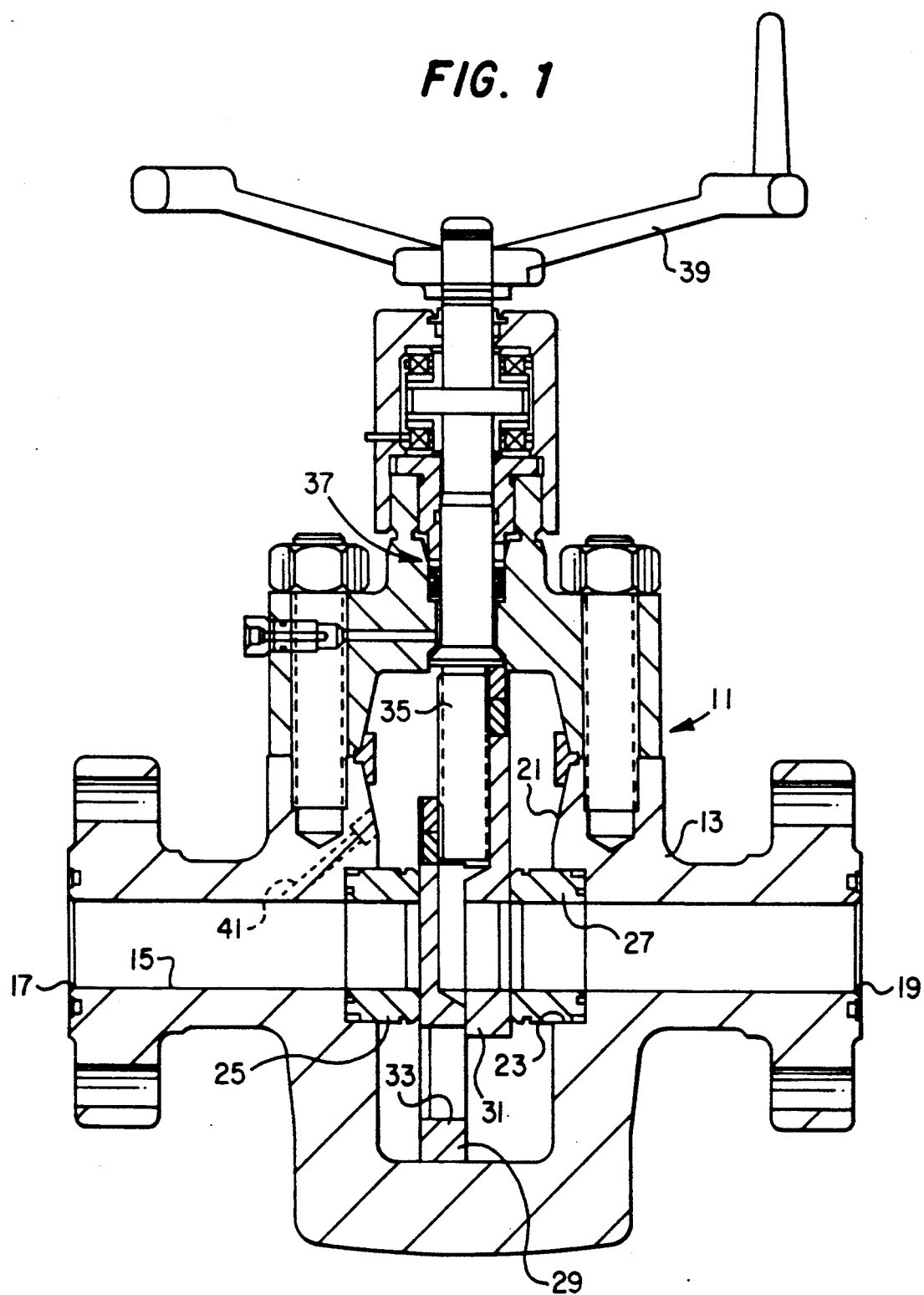
FIG. 1 is a vertical sectional view illustrating a gate valve which has a relief passage shown schematically constructed in accordance with this invention.

Referring to FIG. 1, gate valve 11 has a body 13. Body 13 has a flow passage extending transversely through it. Flow passage 15 has an upstream side 17 and a downstream side 19. The upstream side 17 communicates with a well, while the downstream side leads to production processing equipment. When open, fluid flows from the left side of the drawing toward the right.

Body 13 has a central cavity 21 that is intersected by the flow passage 15. A counterbore 23 locates at the intersections of upstream side 17 and downstream side 19 with cavity 21. Upstream seat ring 25 locates in one of the counterbores 23. A downstream seat ring 27 locates in the other counterbore 23.

A gate is moved past seat rings 25, 27 to open and close flow. The gate is split, having an upstream gate block 29 and a downstream gate block 31. The gate blocks 29, 31 move in unison with each other between the open and closed positions. FIG. 1 shows upstream gate block 29 in the closed position, and downstream gate 31 in the open position merely for illustrative purposes. Each gate block 29, 31 has a passage 33 which aligns with each other and which aligns with the flow passage 15 when in the open position.

An actuator means will move the gate blocks 29, 31 between the open and closed positions. In the embodiment shown, the actuator means includes a nonrising stem 35 which rotates in body 13. Stem 35 has packing 37 to seal to body 13. A handle 39 will rotate stem 35. Stem 35 has threads that engage a nut on the upper ends of the gate blocks 29, 31 to cause the gate blocks 29, 31 to move up and down due to rotation of stem 35.

Figure 2:
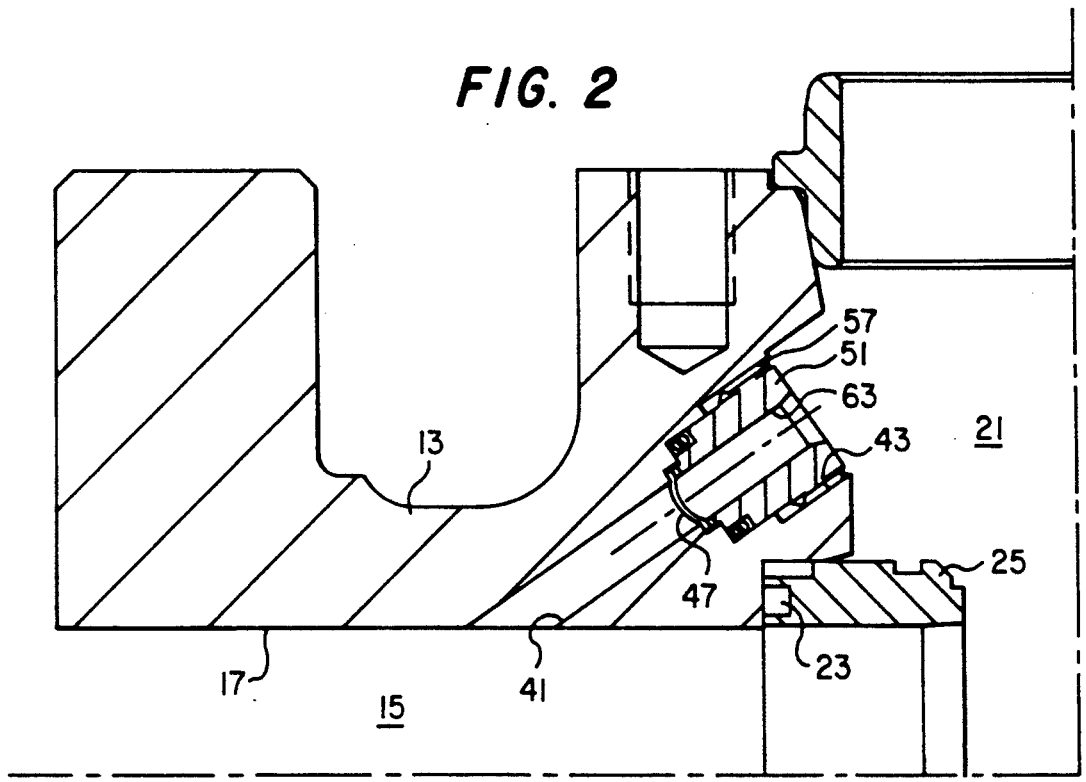
FIG. 2 is an enlarged sectional view of a portion of the gate valve of FIG. 1.
Figure 3:
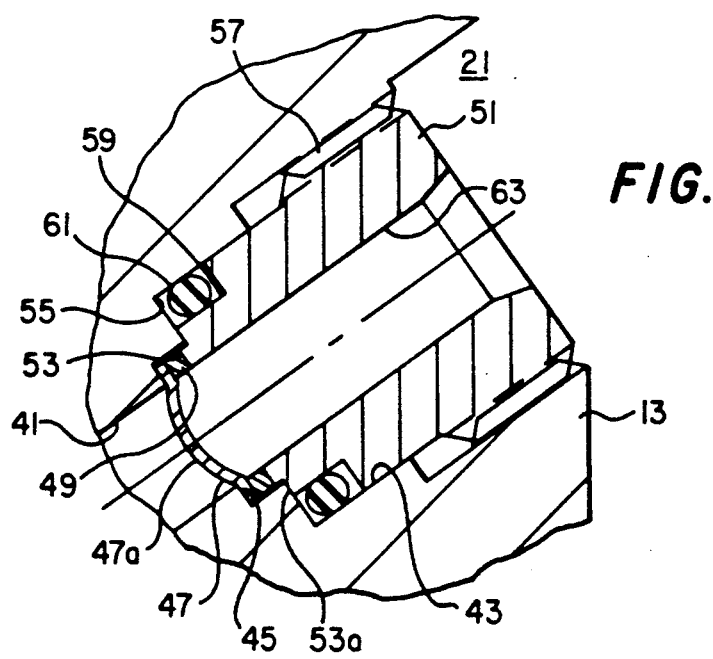
FIG. 3 is an enlarged view of a portion of the gate valve as shown in FIG. 2.

A relief passage 41 extends from cavity 21 to upstream side 17. Relief passage 41 is shown in more detail in FIGS. 2 and 3. Relief passage 41 is a straight port extending at an angle relative to stem 35 (FIG. 1) and to the axis of flow passage 15. A counterbore 43 locates at the upper end of relief passage 41. A retaining shoulder 45 is located at the base of counterbore 43, shown more clearly in FIG. 3. A rupture disk 47 locates on retaining shoulder 45. Rupture disk 47 is a circular metal disk that has a strength selected so that it will rupture at a selected pressure differential. Rupture disk 47 has a bulge 47a that protrudes toward upstream passage side 17. As a result, the amount of pressure differential required to rupture disk 47 is less if the higher pressure is on the side of cavity 21 than if higher pressure were on the upstream side 17. In one embodiment, if the pressure in cavity 21 is more than 5,000 PSI greater than the pressure in upstream passage side 17, then rupture disk 47 will rupture.

A load ring 49 holds rupture disk 47 on retaining shoulder 45. Load ring 49 is a metal solid ring. A retainer 51 holds load ring 49 in place. Retainer 51 has an end 53 that engages load ring 49. End 53 of retainer 51 has an outer portion 53a that is a shoulder that engages a stop shoulder 55. Retainer threads 57 engage mating threads in counterbore 43 to hold retainer 51 in place. Stop shoulder 55 prevents further advancement of retainer 51 once tightly engaged. Retainer 51 has slots (not shown) on its upper end for engagement by a tool to secure retainer 51 in counterbore 43.

A seal groove 59 locates on retainer 51 and extends upward from outer portion 53a. A seal 61 locates in seal groove 59 to seal against a portion of counterbore 43 located immediately upward from stop shoulder 55. Retainer 51 has a passage 63 that extends coaxially through it for communicating fluid from cavity 21 if disk 47 ruptures.

In operation, relief passage 41 will be closed during all normal operations. When valve 11 is open, the gate passages 33 of gate blocks 29, 31 register with flow passage 15. The pressure in cavity 21 will be substantially the same as the pressure in flow passage 15. When gate blocks 29, 31 are to be closed, handle 39 will be rotated, causing gate blocks 29, 31 to move downward to block flow through passage 15. Downstream gate block 31 will seat against downstream seat ring 27. Cavity 21 Will be at the same pressure as the pressure in the upstream passage side 17 because of leakage between upstream gate block 29 and upstream seat ring 25.

If a fire occurs, valve 11 will be closed to stop well fluid from flowing through flow passage 15. If the fire begins to heat the valve body 13, the trapped fluid in cavity 21 will begin to expand. This will cause the upstream gate block 29 to seal against the upstream seat ring 25. The pressure will continue to build due to the heat. If the pressure in cavity 21 becomes as high as the selected amount, for example 5,000 PSI over the pressure in upstream passage side 17, rupture disk 47 will rupture. This allows the high pressure to be relieved through relief passage 41 into upstream side 17. Valve 11 will still remain closed, because downstream gate block 31 will still remain in sealing engagement with downstream seat ring 27. After the fire, if damage to the valve 11 has not been severe, valve 11 may be repaired, with a new rupture disk 47 installed.

The invention has significant advantages. The relief passage and rupture disk prevent excessive pressure buildup in the valve body. This prevents the pressure from causing a leak or rupturing of the valve body. The relief port is passive during all normal operations. The relief port is simple in construction and has no moving parts.

While the invention has been shown in only one of its forms, it should be apparent to those skilled in the art that it is not so limited, but is susceptible to various changes without departing from the scope of the invention.

I claim:

1. In a gate valve having a body with a cavity, a flow passage extending transversely through the cavity, defining an upstream passage side and a downstream passage side, an upstream seat ring located at the intersection of the upstream passage side with the cavity, a downstream seat ring located at the intersection of the downstream passage side with the cavity, a gate, and actuator means for moving the gate through the cavity between the seat rings between open and closed positions, the improvement comprising in combination:
    a relief passage extending from the cavity to the upstream passage side; and
    frangible means located in and blocking flow through the relief passage and breakable if pressure in the cavity exceeds pressure in the upstream passage side by a selected amount, to allow pressure in the cavity to equalize with the upstream passage side.

2. The gate valve according to claim 1 wherein the frangible means comprises a rupture disk.

3. The gate valve according to claim 1 wherein the frangible means comprises a rupture disk which has a bulge protruding toward the upstream passage side so that it will rupture if the pressure in the cavity exceeds that of the upstream passage by the selected amount, but not if the pressure in the upstream passage exceeds that in the cavity by the selected amount.

4. In a gate valve having a body with a cavity, a flow passage extending transversely through the cavity, defining an upstream passage side and a downstream passage side, an upstream seat ring located at the intersection of the upstream passage side with the cavity, a downstream seat ring located at the intersection of the downstream passage side with the cavity, a double block gate having an upstream gate block and a downstream gate block, and actuator means for moving the gate through the cavity between the seat rings between open and closed positions, the improvement comprising a pressure relief means for relieving excessive pressure in the cavity in the event the blocks of the gate are sealingly engaging both seat rings, trapping fluid in the cavity, and in the event heat is applied to the body from a fire, the pressure relief means comprising in combination:
    a relief passage extending from the cavity to the upstream passage side; and
    a rupture disk located in and blocking flow through the relief passage, the rupture disk being rupturable if pressure in the cavity exceeds pressure in the upstream passage side by a selected amount to allow pressure in the cavity to equalize with the upstream passage side.

5. The gate valve according to claim 4 wherein the rupture disk has a bulge protruding toward the upstream passage side so that it will rupture if the pressure in the cavity exceeds that of the upstream passage side by the selected amount, but not if the pressure in the upstream passage side exceeds that in the cavity by the selected amount.

6. The gate valve according to claim 4, wherein the relief passage has a counterbore located at the intersection of the relief passage with the cavity, defining a shoulder, wherein the rupture disk engages the shoulder, and wherein the pressure relief means further comprises retaining means for retaining the rupture disk in engagement with the shoulder.

7. The gate valve according to claim 4, wherein:
    the relief passage has a counterbore located at the intersection of the relief passage with the cavity, defining a shoulder;
    the rupture disk engages the shoulder; and wherein the pressure relief means further comprises:
    a retainer member releasably secured in the counterbore in engagement with the rupture disk for retaining the rupture disk in engagement with the shoulder.

8. The gate valve according to claim 4, wherein:
    the relief passage has a counterbore located at the intersection of the relief passage with the cavity, defining a shoulder, the counterbore having a set of threads;

the rupture disk engages the shoulder; and wherein the pressure relief means further comprises:
a tubular retainer member releasably secured to the threads in the counterbore in engagement with the rupture disk for retaining the rupture disk in engagement with the shoulder.

9. The gate valve according to claim 4, wherein the relief passage has a counterbore located at the intersection of the relief passage with the cavity, defining a shoulder, wherein the rupture disk engages the shoulder and has a bulge protruding toward the upstream passage side, and wherein the pressure relief means further comprises retaining means for retaining the rupture disk in engagement with the shoulder.

10. A gate valve, comprising in combination:
a body with a cavity;
a flow passage extending transversely through the cavity, defining an upstream passage side and a downstream passage side;
an upstream seat ring located at the intersection of the upstream passage side with the cavity;
a downstream seat ring located at the intersection of the downstream passage side with the cavity;
a double block gate having an upstream gate block and a downstream gate block;
actuator means for moving the gate through the cavity between the seat rings between open and closed positions;
a relief passage extending from the cavity to the upstream passage side;
a counterbore located in the relief passage at the intersection of the relief passage with the cavity, defining a shoulder;
a rupture disk located in the relief passage in engagement with the shoulder; and
a tubular retainer releasably secured in the counterbore for holding the rupture disk in engagement with the shoulder; and
the rupture disk having a strength selected to cause the rupture disk to rupture if pressure in the cavity exceeds pressure in the upstream passage side by a selected amount, for relieving excessive pressure in the cavity in the event the blocks of the gate are sealingly engaging both seat rings, trapping fluid in the cavity, and in the event heat is applied to the body from a fire, thereby threatening to increase the pressure in the cavity beyond the capacity of the valve.

11. The gate valve according to claim 10, wherein the retainer is secured by threads provided in the counterbore.

12. The gate valve according to claim 10, wherein the retainer has a bulge protruding toward the upstream passage side.

13. A method of relieving pressure in a gate valve having a body, a flow passage extending transversely through the cavity, defining an upstream passage side and a downstream passage side, an upstream seat ring located at the intersection of the upstream passage side with the cavity, a downstream seat ring located at the intersection of the downstream passage side with the cavity, a gate, and actuator means for moving the gate through the cavity between the seat rings between open and closed positions, comprising:
providing a relief passage extending from the cavity to the upstream passage side;
mounting a frangible member in the relief passage which blocks flow through the relief passage unless pressure in the cavity exceeds pressure in the upstream passage side by a selected amount; then, if a fire occurs and the gate is closed into engagement with both seat rings, trapping fluid in the cavity which is being heated by the fire,
breaking the frangible member to allow pressure in the cavity to equalize with the upstream passage side.

* * * * *